United States Patent [19]

Mochimaru et al.

[11] Patent Number: 5,432,532
[45] Date of Patent: Jul. 11, 1995

[54] VIDEO PRINTER FOR PRINTING PLURALITY OF KINDS OF IMAGES OF DIFFERENT IMAGE FORMATS

[75] Inventors: Yoshiaki Mochimaru, Yamato; Toshihiko Gotoh, Tokyo; Koichi Tomatsuri, Katsuta, all of Japan

[73] Assignees: Hitachi, Ltd., Kanagawa; Hitachi Video & Information Systems, Inc., Tokyo, both of Japan

[21] Appl. No.: 941,923

[22] Filed: Sep. 8, 1992

[30] Foreign Application Priority Data

Oct. 11, 1991 [JP] Japan .................. 3-263554

[51] Int. Cl.⁶ .............................................. B41J 2/32
[52] U.S. Cl. ..................................... 347/176; 358/296
[58] Field of Search ................... 346/76 PH; 400/120; 358/335, 296

[56] References Cited

FOREIGN PATENT DOCUMENTS 462784 of 0000 European Pat. Off. .

*Primary Examiner*—Huan H. Tran
*Attorney, Agent, or Firm*—Antonelli, Terry, Stout & Kraus

[57] ABSTRACT

A video printer for printing a plurality of kinds of images having different image formats, consisting of an image memory for storing image data of one image portion of an input image signal, an image data processing unit for converting image data from the image memory into image printing data, an image printing unit for executing an image printing based on image printing data from the image data processing unit, an input image format decision unit for deciding an image format of an image signal inputted to the image memory, an image format decision unit for deciding an image printing format determined by either an image printing sheet or an ink sheet set to the image printer, an operating portion for inputting an instruction of an operator, and a system controller for controlling the image memory or the image data processing unit so that the image signal inputted to the image memory is printed to match the image printing format, based on an input signal decision signal from the input image format decision unit, an image printing decision signal from the image printing format decision unit and an instruction signal from the operating portion.

29 Claims, 14 Drawing Sheets

INK LENGTH a
402A

INK LENGTH b
402B

FIG. 13

| PRINTING SHEET \ INK SHEET | STANDARD | LATERALLY LONG | INPUT SIGNAL |
|---|---|---|---|
| STANDARD | A | A | STANDARD |
| | C | C | UPPER AND LOWER MASKED |
| | C, COMPRESSED | C, COMPRESSED | LATERALLY LONG WIDE |
| LATERALLY LONG | F | E', EXPANDED (UPPER AND LOWER CUT) (F      ) | STANDARD |
| | G | E, EXPANDED (MASK ELIMINATED) | UPPER AND LOWER MASKED |
| | G, COMPRESSED | E | LATERALLY LONG WIDE |

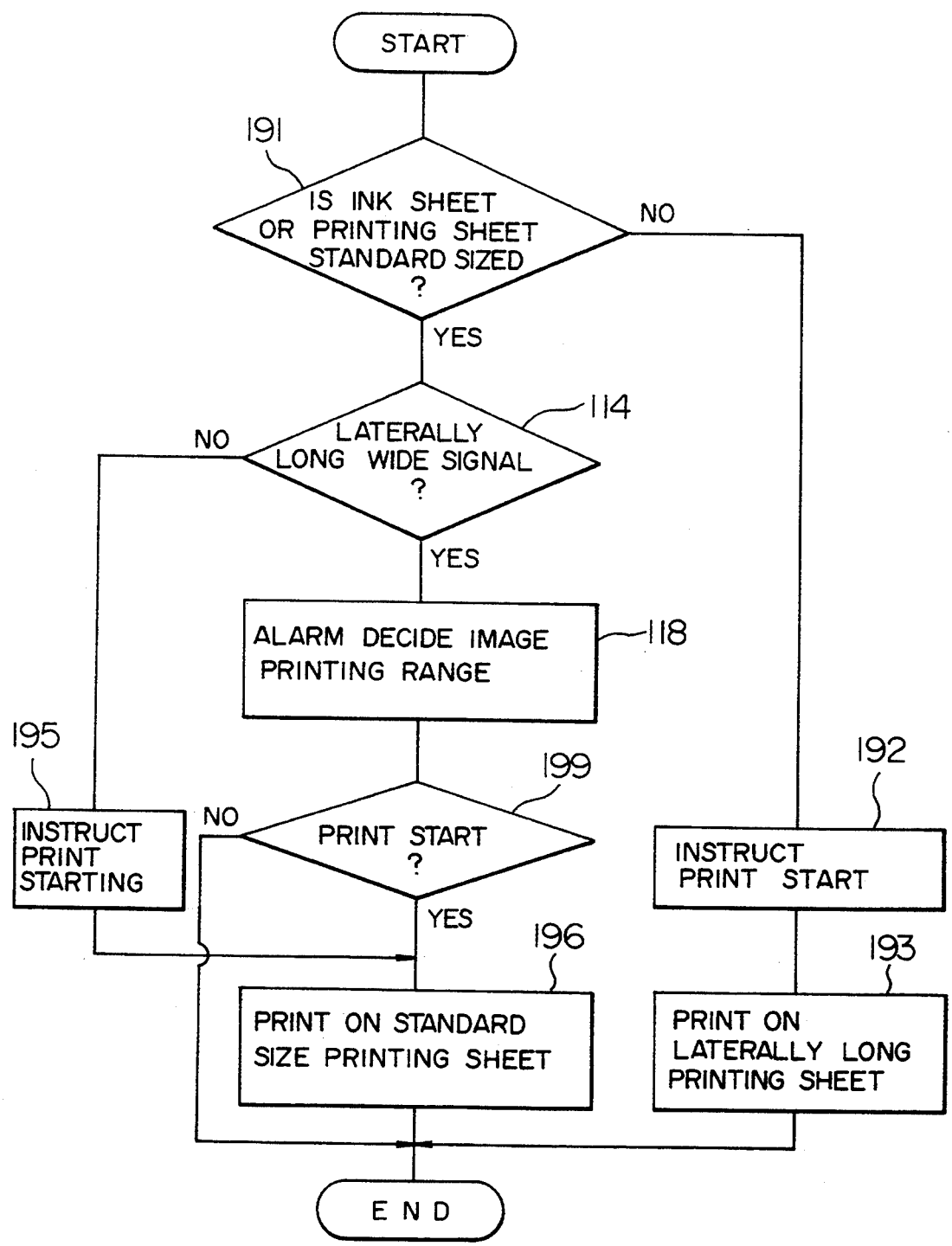

VIDEO PRINTER FOR PRINTING PLURALITY OF KINDS OF IMAGES OF DIFFERENT IMAGE FORMATS

BACKGROUND OF THE INVENTION

The present invention relates to a video printer for obtaining a hard copy from a video signal, and relates, more particularly, to a video printer for printing a plurality of kinds of images of different image formats, which is designed to be able to obtain a hard copy from a video signal corresponding to a screen of a laterally long direction as well as a standard video signal.

In the recent years, there have been proposed video signal formats having a vertical to lateral screen aspect ratio which is different from the conventional vertical to lateral screen aspect ratio of 3 to 4 for standard television signals such as the NTSC and PAL systems. For these new signal formats, the vertical to lateral screen aspect ratio of 9 to 16 or the like (hereinafter to be referred to as a standard video signal), having a larger lateral length than the lateral length of the conventional screen, has been proposed. These new signal formats include a signal format such as "a wide NTSC" (hereinafter to be referred to as a laterally long wide signal) for transmitting an image signal having a vertical to lateral screen aspect ratio of 9 to 16 on the conventional NTSC signal. The method for transmitting an image signal of a geometrically larger lateral length than the vertical length on the conventional standard television signal will hereinafter be referred to as a wide NTSC or a wide signal system. It is needless to mention that an image of a larger lateral length can be similarly transmitted by the PAL or SECAM system. This will be explained below with reference to FIGS. 6, 7 and 9.

When an image of the conventional NTSC system is printed by the conventional video printer, an image print as shown in FIG. 6, for example, is obtained. The image obtained in this case is uniform, or similar to the image reproduced in the picture tube. In this case, an image picked up with the vertical to lateral screen aspect ratio of 3 to 4 was transmitted and reproduced in a uniform shape for printing. Similarly, when an image of the wide NTSC system is printed by the conventional printer, an image print as shown in FIG. 9 is obtained. In this case, a signal of the image is based on the assumption that the image is to be reproduced on the picture tube having a vertical to lateral screen aspect ratio of 9 to 16. Therefore, the image reproduced and printed has a larger vertical to lateral aspect ratio than the vertical to lateral aspect ratio of the original image, causing a wrong vertical to lateral aspect ratio for the printing. In other words, a true circle of the image is printed in an oval shape. According to the conventional video printer, the vertical to lateral screen aspect ratio of the image which is inputted as a signal is decided to be one fixed ratio when the input signal is decided, so that the problem as observed in FIG. 9 does not occur. However, according to the proposal of the wide NTSC system, geometrically different signals can exist even if the signals are electrically the same.

Further, as a conventional method for transmitting an image of a larger lateral length, there has been a method for transmitting the image by providing masked portions, usually set in black levels, at the upper and lower portions of the image having a vertical to lateral screen aspect ratio of 3 to 4 (hereinafter to be referred to as a masked signal), as shown in FIG. 7. According to this method, a laterally long image is transmitted but the masked portions are printed as black belts, so that the image printed is not beautiful to look at or the size of the printed image becomes smaller.

As a conventional printer, "a color hard copy unit" has been available as disclosed in the JP-A-56-64884. However, in this case, sufficient consideration has not been given to a video signal having an image display of a larger lateral length as described above.

SUMMARY OF THE INVENTION

It is an object of the present invention to provide a video printer which can correctly reproduce a vertical to lateral screen aspect ratio of an image that is originally held in an input signal.

It is another object of the present invention to provide a video printer which can obtain a print excluding black belts that are an obstacle for viewing the print.

In order to correctly reproduce a vertical to lateral screen aspect ratio which is originally held in an input signal, a printing sheet and an ink sheet having a larger lateral to vertical screen aspect ratio than that of the conventional system are prepared in addition to a standard printing sheet and a standard ink sheet for a signal having the conventional vertical to lateral screen aspect ratio of 3 to 4, respectively, and a decision unit is provided for deciding whether the printing sheet and the ink sheet set to a video printer are for a standard image or for an image of a larger lateral length so that the printing sheet is selected according to the vertical to lateral screen aspect ratio of the input signal, to correctly match the selected printing sheet with the vertical to lateral screen aspect ratio of the input image for printing.

BRIEF DESCRIPTION OF THE DRAWINGS

FIG. 13 is a table for deciding a printing mode according to the present invention;

FIG. 19 is a flow chart for explaining the operation of the embodiment shown in FIG. 18.

DESCRIPTION OF THE PREFERRED EMBODIMENTS

A first embodiment of the present invention will be explained with reference to FIG. 1.

Figure 1:
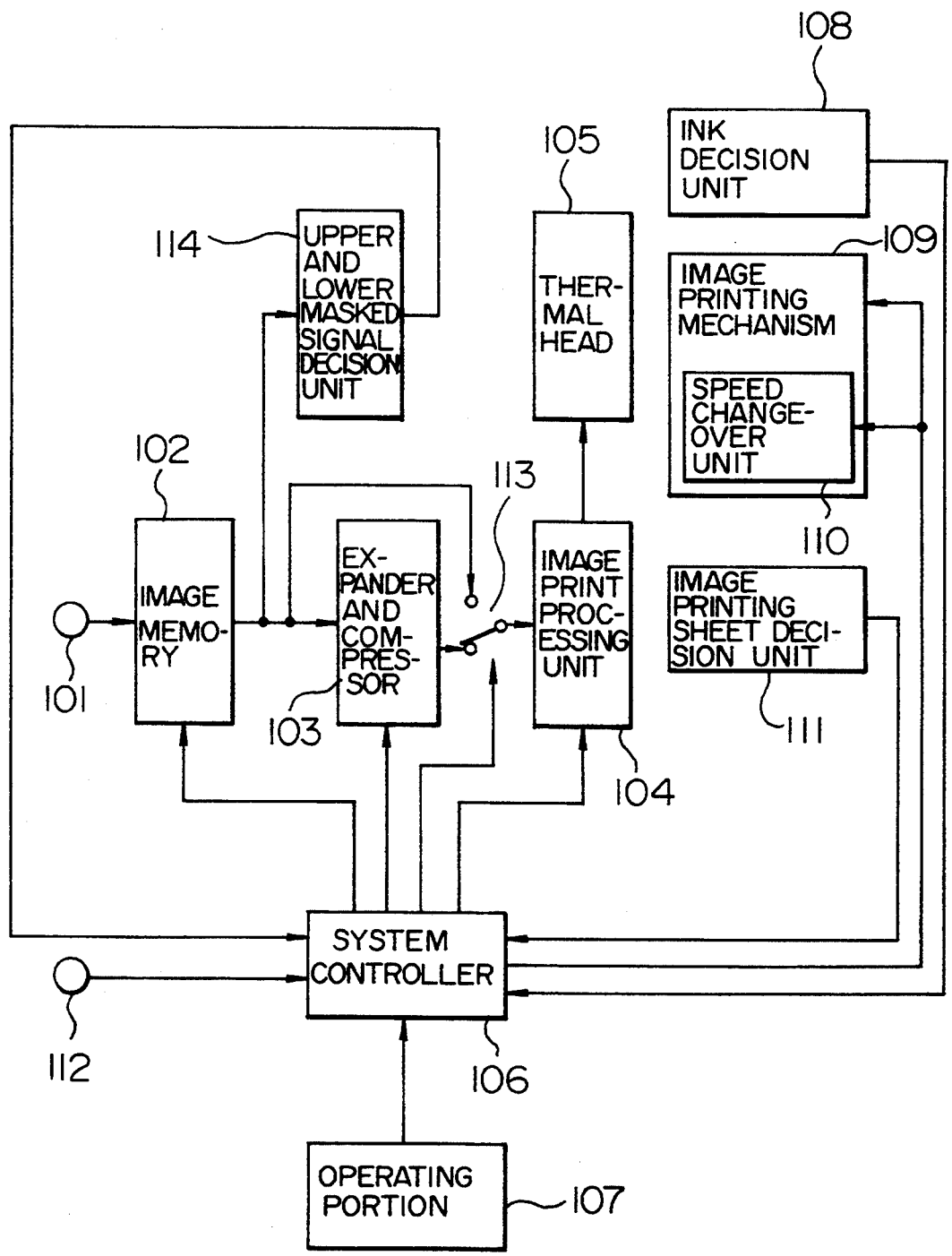
FIG. 1 is a block diagram for showing one embodiment of the present invention.

Referring to FIG. 1, 101 designates an input terminal of an image signal for an image to be printed. Image data is applied to this input terminal from a television receiver or a VTR not shown. 102 designates an image data memory having a memory area corresponding to one image to be printed, and 103 designates an expander and compressor for processing image data from the image data memory 102 by expanding or compressing an image to be printed only in a vertical direction. 113 designates a change-over switch for changing over between image data from the image memory 102 and image data from the expander and compressor 103, by a system controller 106. 104 designates an image print processing unit for producing image data for driving a thermal head 105 which prints an image after signal processing image data which has been selected by the change-over switch 113.

Figure 7:
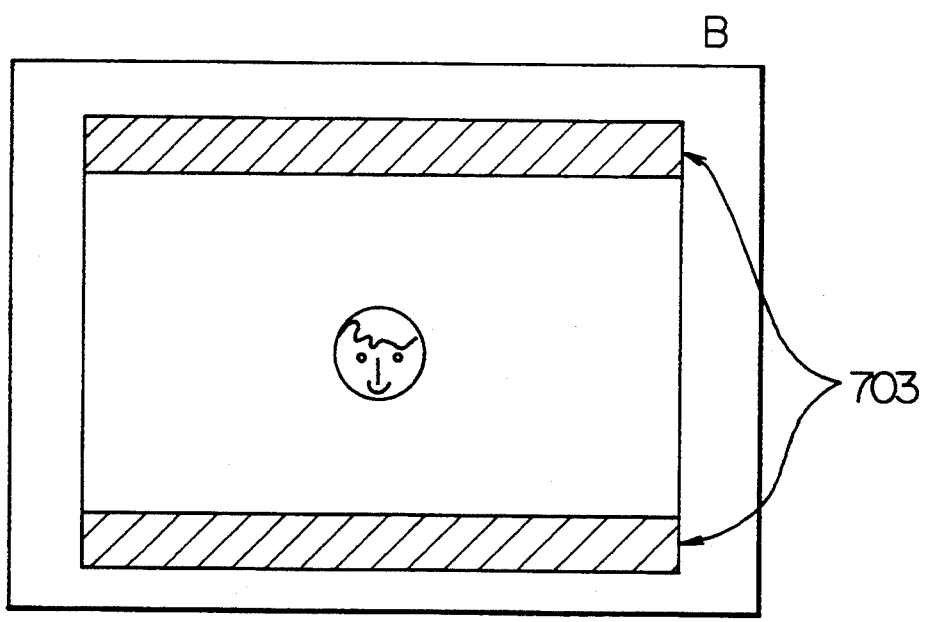

107 designates an operating portion for inputting an image printing instruction or inputting other necessary commands at a timing when a user has found an image to be printed while he (or she) was watching images over a CRT not shown. 108 designates an ink decision unit loaded on an image printing mechanism 109 for printing an image. The ink decision unit 108 decides a kind of an ink sheet and a length of an ink sheet by color by detecting these with a decision unit provided in an ink cassette for winding and holding the ink sheet. 110 designates a speed change-over unit for changing over the carrying speed of a carrying mechanism for carrying a printing sheet provided in the image printing mechanism 109. 111 designates an image printing sheet decision unit for deciding the length of a printing sheet by detecting a size of the printing sheet loaded on a tray with an optical unit or the like. 112 designates an input terminal for applying, for example, a 5 V DC component, peculiar to a laterally long wide signal, included in a signal inputted from the input terminal 101. By applying this signal, it becomes possible to decide whether the signal is a laterally long wide signal or not. 114 designates an upper and lower masked signal decision unit for deciding a laterally long wide signal of the upper and lower masking system for having upper and lower black belts on the screen as shown in FIG. 7. The upper and lower masked signal decision unit 114 makes a decision by detecting whether the data read out from the main portion of the image data memory portion corresponding to the upper and lower masked portion from the image memory 102 is all black level or not.

Accordingly, by the input signal from the input terminal 112, a decision is made whether an image signal inputted from the input terminal 101 is a laterally long wide signal or not. When the input image signal is not a laterally long wide signal, a decision is made, based on the signal from the upper and lower masked signal decision unit 114, whether the input image signal is an upper and lower masked signal or not. If a decision is made in this case that the input image signal is not an upper and lower masked signal, a decision can be finally made that a standard image signal has been inputted to the input terminal 101.

106 designates a system controller, storing a microcomputer, for controlling the overall operation of the video printer based on signals from the operating portion 107, the ink decision unit 108, the image printing sheet decision unit 111, the input terminal 112 and the upper and lower masked signal decision unit 114, respectively.

Figure 2:
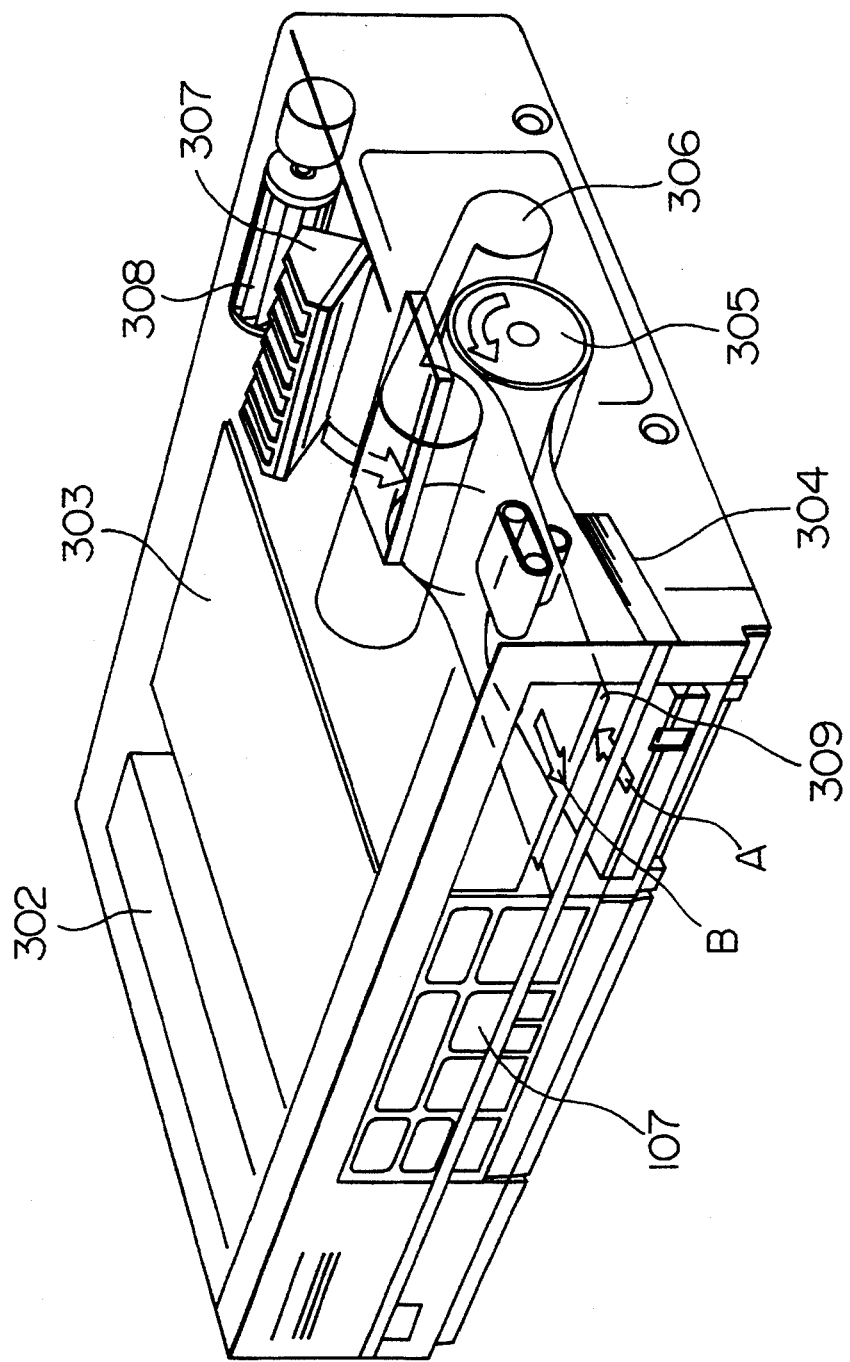
FIG. 2 is a perspective view for showing the structure of the printer relating to the present invention.

FIG. 2 is a configuration diagram of the video printer relating to the embodiment shown in FIG. 1. Referring to FIG. 2, 107 designates an operation portion in which an operation button and a display portion are disposed, 302 designates a power source portion for this video printer, and 303 designates a circuit portion of the video printer. 304 designates a recording sheet loading portion in which printing sheets are piled up, 305 designates a platen roller for winding up a printing sheet for printing, and 306 designates an ink cassette in which ink sheets are loaded. 307 designates a thermal head, 308 designates a radiation fan and 309 designates a sheet exhausting portion. In FIG. 2, a thin belt-shaped path is shown which runs from an arrow A to an arrow B round the platen roller 305. This is a path for passing a printing sheet. A printing sheet is wound around the platen roller 305 within one rotation. While the platen roller 305 makes three rotations, three principal colors are sequentially loaded to provide a printed color image. A printing sheet may be a long roll-shaped sheet, which may be cut to any length necessary for making a printout.

Figure 3:
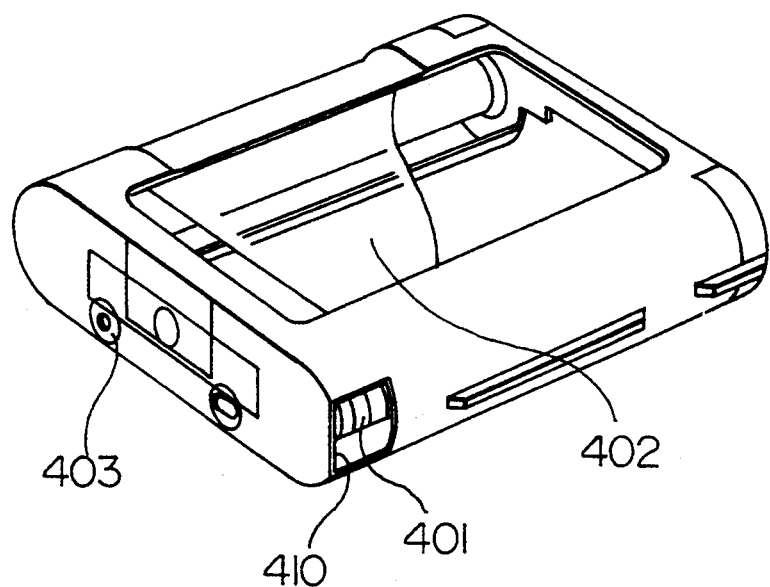
FIG. 3 is a perspective view for showing an example of an ink cassette relating to the present invention.
Figure 4:
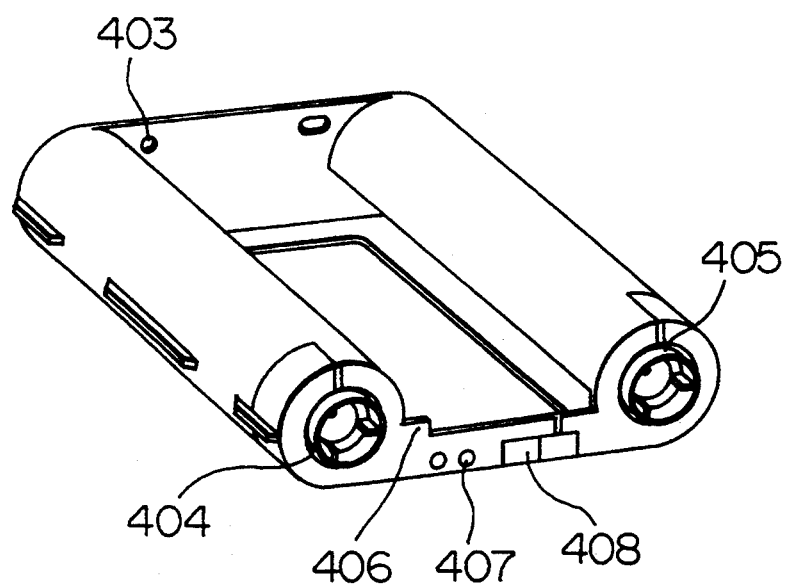
FIG. 4 is a perspective view of the ink cassette of FIG. 3 which is turned upside down.

FIG. 3 is a perspective view of the ink cassette 306 shown in FIG. 2, and FIG. 4 is a perspective view of the ink cassette which is turned upside down.

An ink sheet 402 is a semitransparent belt-shaped film which is wound around one of two ink shafts 404 and 405 and is used by being wound up by the other ink shaft.

Figure 5A:
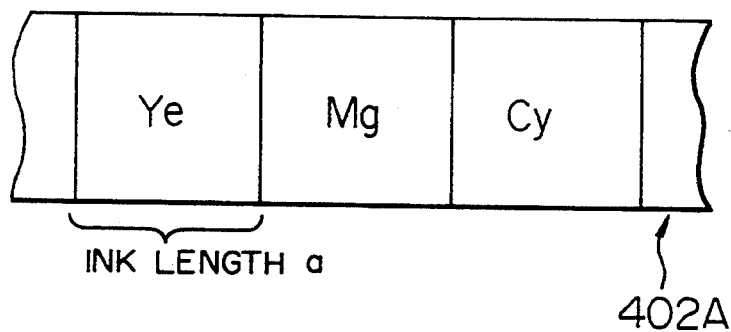
FIGS. 5A and 5B are diagrams for showing mutually different kinds of ink sheets.
Figure 5B:
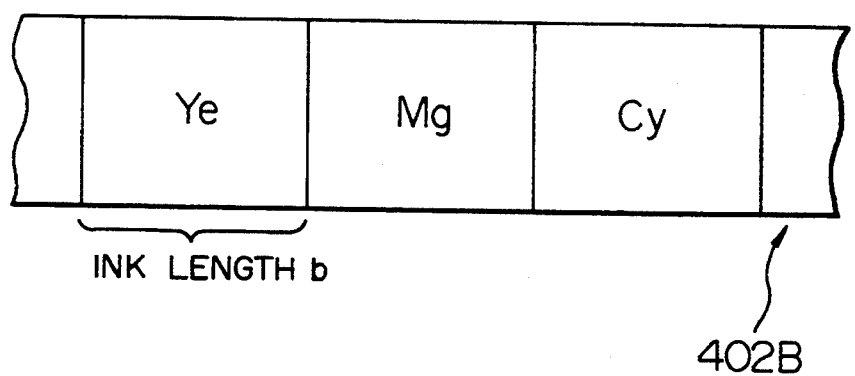

FIGS. 5A and 5B show examples of an ink sheet to be used in the present invention. In FIG. 5A, 402A designates a standard ink sheet, and in FIG. 5B, 402B designates a laterally long ink sheet. In the present examples, ink sheets made up of three colors of yellow (Ye), magenta (Mg) and cyanogen (Cy) are shown. A printing in the order of these colors is assumed and three color planes for one picture are shown in both FIGS. 5A and 5B. Inks of the three colors for several dozens to several hundred pictures are prepared in the ink sheet by repeating these colors in the ink cassette. The standard ink sheet is an ink sheet for printing a signal having the conventional standard screen of a vertical to lateral screen aspect ratio of 3 to 4. The laterally long ink sheet is an ink sheet prepared to have a larger lateral length for the vertical to lateral screen aspect ratio of 9 to 16. An ink length b is prepared to have a larger lateral length than an ink length a by the portion of an increased lateral length (approximately 1.3 times).

Referring to FIGS. 3 and 4, 401 designates a bar code for showing a kind of an ink sheet a length of an ink sheet and a length of a color section, printed at the outer periphery of the ink shaft. This bar code can be read by an optical unit through an opening 410. This kind of decision code can be provided at a portion of the ink cassette, in the forms of a projection 406, a plurality of holes 407 and a plurality of reflecting panels 408. By providing a decision code in a plurality of ways as described above, this ink cassette can be applied to video printers of various systems. With the above arrangement, length of color section of an ink sheet can be decided by a symbol of decision provided in the ink cassette. The system controller 106 can detect the length of a printing sheet by the sensor provided at the recording sheet loading portion 304 or at the carrying path for a printing sheet or based on input information from the operating portion 301.

403 designates a positioning hole for loading the ink cassette 306 to the printer.

The operation will be explained with reference to FIG. 2.

Once a printing of an image has been started, a recording sheet loaded in the recording sheet loading portion 304 is wound around the platen roller 305. The thermal head 307 moves it position to press the ink sheet within the ink cassette 306 to the printing sheet wound around the platen roller 305. The platen roller 305 makes three rotations with the printing sheet wound around the platen roller. Along with the rotation shift of the printing sheet, the ink sheet also makes a shift for the portion of three color planes. During this shift rotation, the thermal head 307 is rendered conductive to execute the printing. After, the three rotations, the printing sheet after the printing is exhausted to the exhausting portion 309.

The overall configuration of the first embodiment of the present invention has been explained above with reference to FIGS. 1 to 5. The operation of the first embodiment will now be explained with reference to FIG. 1.

A signal inputted from the input terminal 101 is recorded in the image memory 102. The recorded image data is inputted to the image print processing unit 104 either through or not through the expander and compressor 103 for the image data. The signal is then converted by the image print processing unit 104 into a driving signal including an intermediate tone processing corresponding to the thermal head 105 to be used for printing, and is printed by the thermal head 105.

The image printing mechanism 109 carries out the processing necessary for image processing such as feeding of a printing sheet and carrying an ink sheet and a printing sheet. The ink decision 108 decides length of the color section of the ink sheet and kind of the ink sheet that is loaded to the video printer and transmits the result of the decision to the system controller 106. The image printing sheet decision unit 111 similarly decides the length and kind of the printing sheet and transmits the result of the decision to the system controller 106. The system controller 106 receives from the input terminal 112 the decision information of whether the image signal inputted to the input terminal 101 from the image unit connected at the front stage is a laterally long wide signal or not. In the case of the image unit, connected at the front stage, which outputs only a standard signal of the conventional vertical to lateral screen aspect ratio of 3 to 4, this image unit does not have an output unit for such decision information. Therefore, nothing is connected in this case. The system controller 106 obtains information about whether the image inputted to the input terminal 101 is a laterally long wide signal or not based on presence or absence of the signal from the input terminal 112. The upper and lower masked signal decision unit 114 decides whether the stored signal is an upper and lower masked signal or not. The upper and lower masked signal has the masked portion fixed by a black level substantially similar to the blanking level, so that a decision can be made by inspecting the signal at the upper and lower masked portions within the image memory.

The operating portion 107 receives from the operator a signal for storing an image and for starting printing. Information relating to the size of a printing sheet can also be obtained from the operating portion 107.

By the above-described operation, the system controller 106 can obtain information such as length of a printing sheet, length of an ink sheet and kind of an input signal. Based on this information, what kind of image printing is to be carried out is decided. Before explaining how to make this decision, various modes of printing will be explained with reference to FIGS. 6 to 12.

In FIGS. 6 to 12, an external frame shows the size of a printing sheet and an internal frame shows the size of a printed image, showing different vertical to lateral aspect ratios among these figures.

Figure 6:
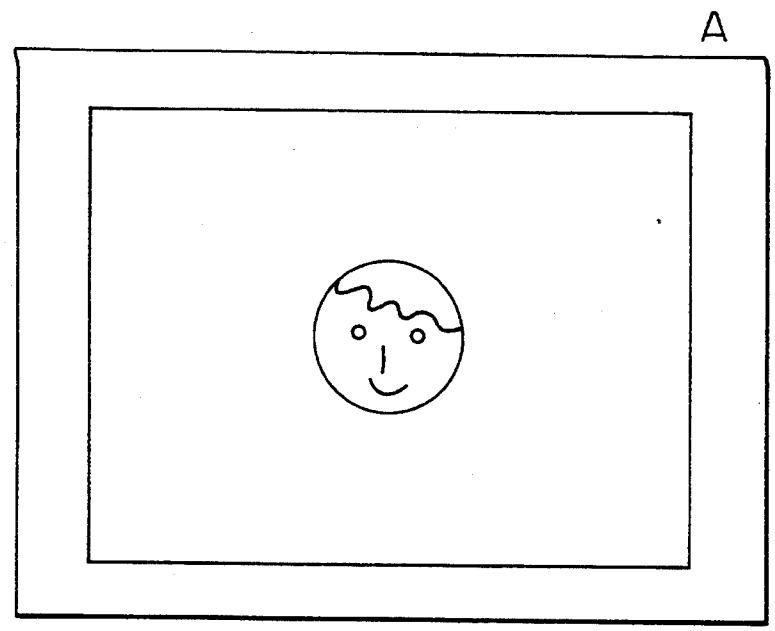
FIGS. 6 to 12 show examples of image printing which are results of an image printed in mutually different modes.

FIG. 6 is a diagram for showing the print out of the signal of a vertical to lateral aspect ratio of 3 to 4 printed on a printing sheet of the conventional standard length (print example A).

FIG. 7 is a diagram for showing the print out of the image, transmitted by the upper and lower masking system, printed on a standard-size printing sheet by the conventional printer (print example B). In this case, the black belt 703 is printed at the upper and lower portion of the image.

Figure 8:
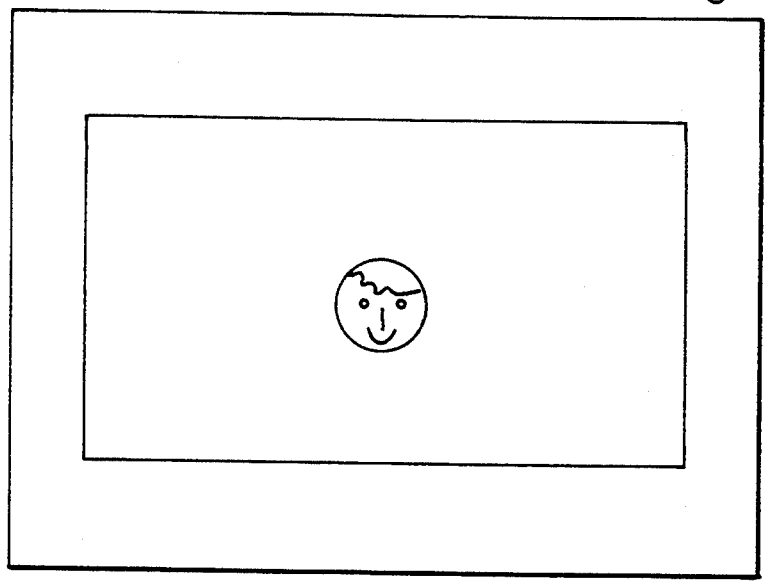

FIG. 8 is a diagram for showing the print out of the laterally long wide image printed on a standard printing sheet or the image printed by eliminating the upper and lower masked portions of the upper and lower masked image (print example C).

Figure 9:
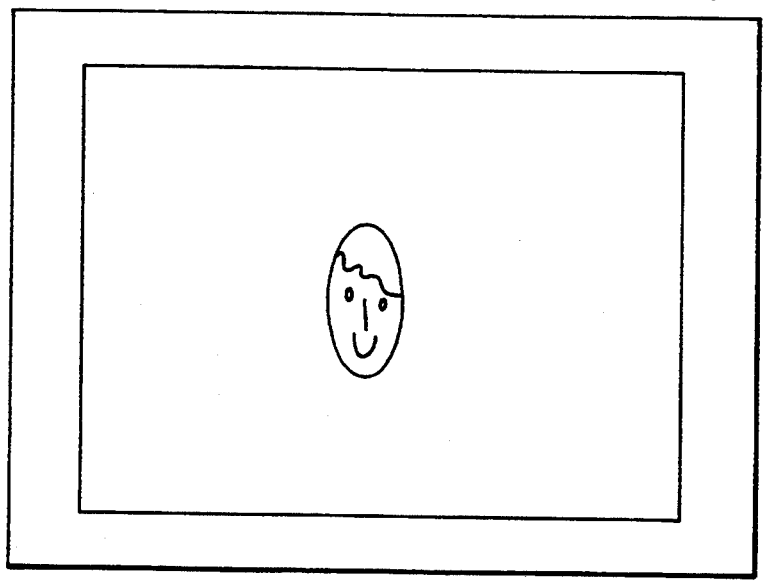

FIG. 9 is a diagram for showing the print out of the laterally long wide NTSC image printed on a standard printing sheet by the conventional printer (print example D). In this case, the image is printed as a vertically long image.

Figure 10A:
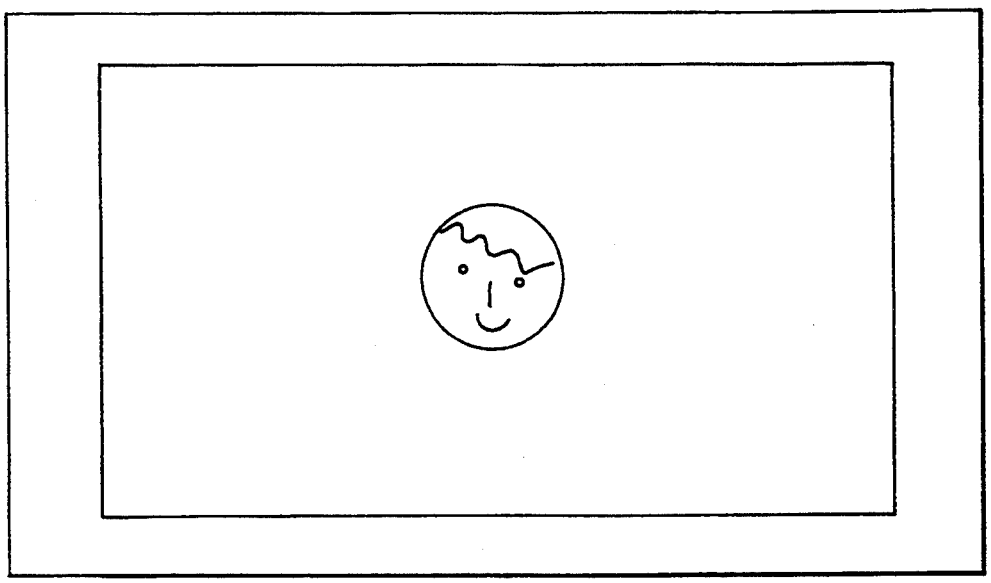

FIG. 10A is a diagram for showing the print out of laterally long wide image printed on a laterally long printing sheet by using a laterally long ink sheet (print example E).

Figure 10B:
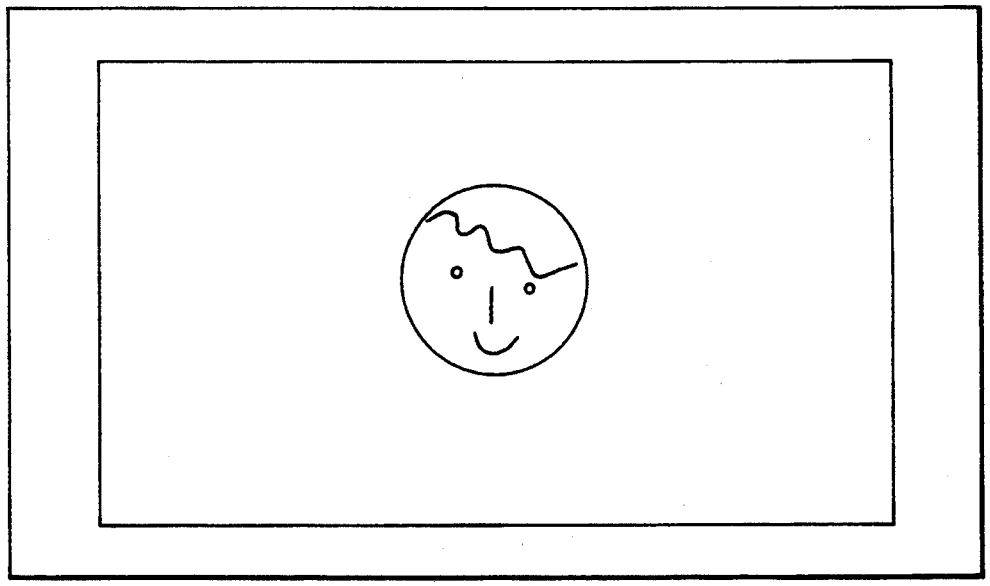

FIG. 10B is a diagram for showing the print out of a standard image vertically and laterally expanded and printed on a laterally long printing sheet (print example E'). In this case, the image is printed with the upper and lower portions of the image cut out.

Figure 11:
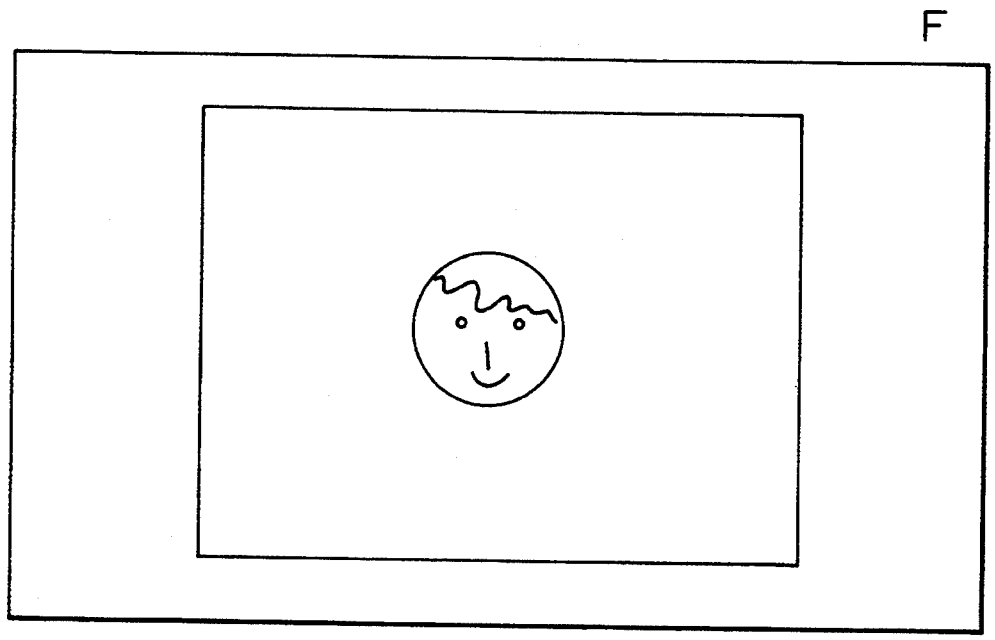

FIG. 11 is a diagram for showing the print out of the image of the vertical to lateral aspect ratio of 3 to 4 printed on a laterally long printing sheet (print example F).

Figure 12:
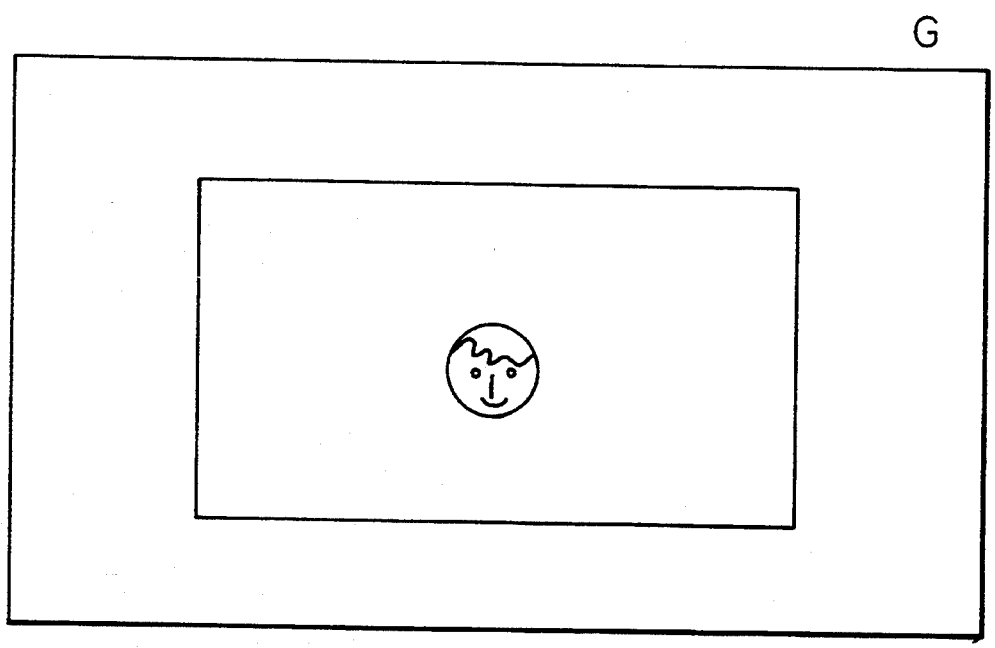

FIG. 12 is a diagram for showing the print out of the laterally long wide image compressed and printed on a laterally long printing sheet (print example G).

How to decide a method for image printing will now be explained with reference to FIG. 13.

Referring to FIG. 13, the left column of the table is the column for showing a size of a printing sheet set in the image printing unit. "Standard" shows the case that a image printing sheet of the standard size having the vertical to lateral aspect ratio of 3 to 4 has been set to the image printing unit, and "Laterally long" shows the case that an image printing sheet for a laterally long wide image having the vertical to lateral aspect ratio of 9 to 16 has been set to the image printing unit. The top row of the table shows kinds of ink sheets loaded on the image printing unit. "Standard" in the top row shows the case that the ink cassette accommodating a standard ink sheet shown in FIG. 5A has been loaded to the image printing unit, and "Laterally long" in the top row shows the case that the ink cassette accommodating a laterally long ink sheet shown in FIG. 5B has been loaded to the image printing unit. Further, the right column of the table shows whether the input signal inputted to the input terminal 101 in FIG. 1 is a standard image signal, an upper and lower masked signal or a laterally long wide signal.

Accordingly, the table shown in FIG. 13 identifies a mode of a picture to be printed among the print examples A to G shown in FIGS. 6 to 12, in accordance with a size of a printing sheet set to the image printing unit, a kind of an ink sheet and a kind of an input signal. The table in FIG. 13 is stored in the memory of the system controller 106. A plurality of print examples shown by using parentheses in some rows mean that one of the print modes shown in the respective rows can be selected according to a command from the operating portion 107. It is also good to design that a print out is made by only one of these alternative modes.

The table in FIG. 13 will be explained below.

First, description will be made of the case where a standard printing sheet has been set to the image printing unit. In this case, a standard ink sheet is used to print in a standard size when the printing sheet is a standard size. When the ink sheet used is laterally long, the whole size of the ink sheet is not used because a printing can not be made in excess of the length of the printing sheet. A print out is made according to the signal for printing in a combination of a standard printing sheet and a standard ink sheet. As described above, when a standard printing sheet has been set when the input signal is a standard signal of the vertical to lateral aspect ratio of 3 to 4 like the conventional NTSC signal, the signal of the image memory is printed directly without using the expander and compressor 103 as shown in FIG. 1, and a print out as shown in FIG. 6 (print example A) is obtained. When the input signal is a laterally long signal of the upper and lower masking system, a straight print out of the image causes the upper and lower black belts to appear which are not beautiful to look at, as shown in FIG. 7 (print example B). Therefore, the black belt portions are eliminated by the image print processing portion and a print out as shown in FIG. 8 (print example C) is obtained. When the input signal is a laterally long wide NTSC signal, the image is vertically compressed by the image expander and compressor 103 shown in FIG. 1 and a print out as shown in FIG. 8 (print example C) is obtained.

Next, description will be made of the case where the printing sheet and the ink sheet are laterally long. In this case, when the input signal is a standard signal, the image signal is expanded and the upper and lower portions are cut off to have a print out as shown in FIG. 10B (print example E), or a standard print out of the vertical to lateral aspect ratio of 3 to 4 is made on the laterally long printing sheet as shown in FIG. 11 (print example F). The above print out can be made either by selecting and fixing to one printing mode based on the design idea or by changing over between the two printing modes by the signal from the operating portion 107. When the input signal is an upper and lower masked signal, the masks can be eliminated and the image can be expanded to obtain a wide print out as shown in FIG. 10A (print example E). The masked portions can be eliminated either by rewriting the content of the image memory or by replacing the masked portions with data showing "white" by the image print processing portion. Alternatively, the content of the memory corresponding to the upper and lower masked portions in the image memory 102 can be all rewritten by a white level. Further, it is also good to eliminate the signal corresponding to the upper and lower masked portions from the image data read out from the image memory. In the case of the laterally long wide NTSC signal, a print out as shown in FIG. 10 (print example E) can be obtained by increasing the speed of carrying the printing sheet by about 1.3 times the standard speed by the speed change-over unit 110 shown in FIG. 1. Expansion or compression of the image by a signal processing is not particularly required.

Next, description will be made of the case where a standard ink cassette has been loaded although a laterally long printing sheet has been set. In this case, when a standard image signal has been inputted, an image print out as shown in FIG. 11 (print example F) is obtained, and when an upper and lower masked signal has been inputted an image print out with the masked portions eliminated is obtained as shown in FIG. 12 (print example G). When a laterally long wide signal has been inputted, the vertical direction of the image is compressed by the expander and compressor 103 and the image is printed at the low speed side by the speed change-over unit 110.

Figure 14:
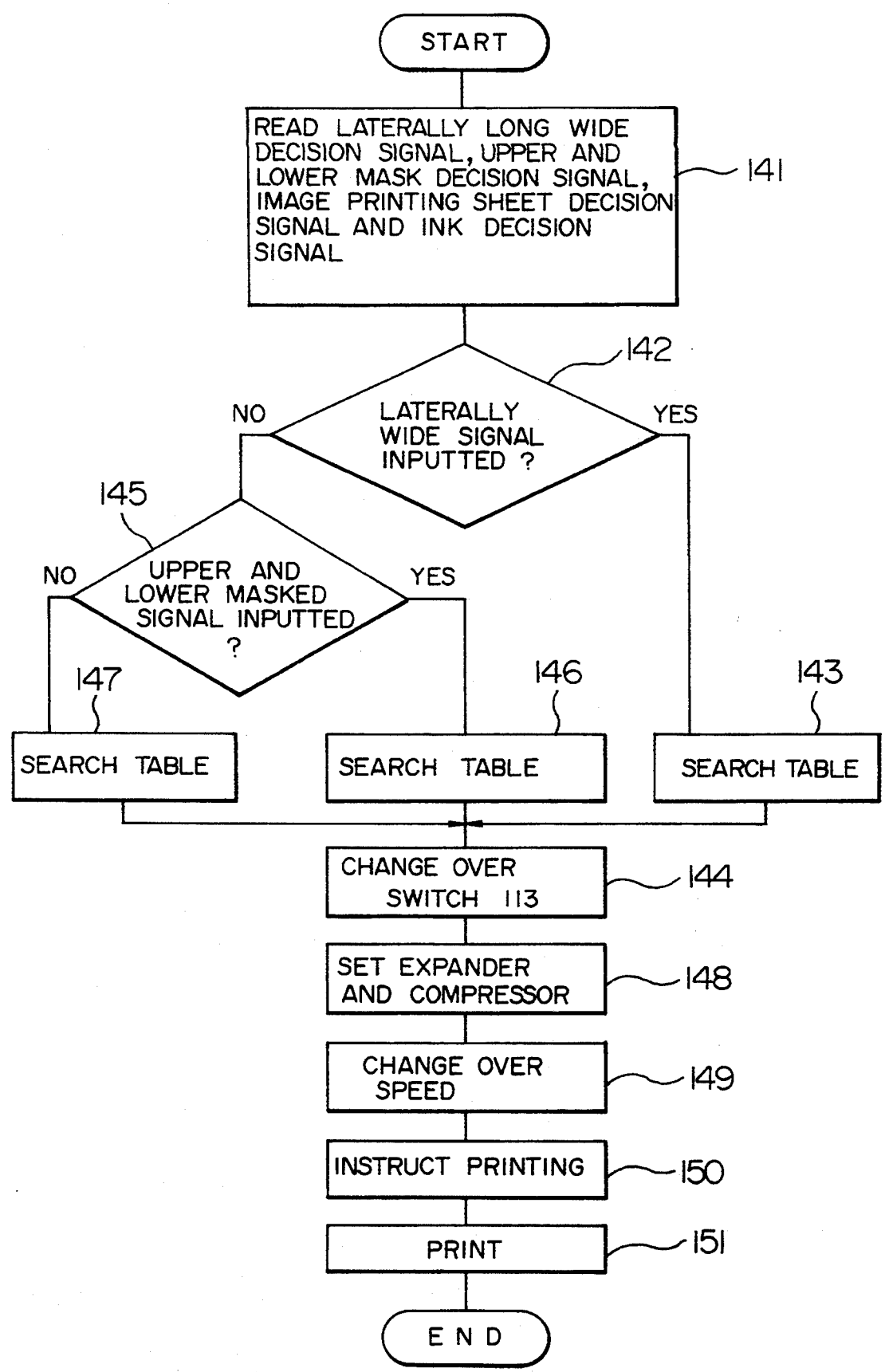
FIG. 14 is a flow chart for explaining the operation of the embodiment shown in FIG. 1.

In the above embodiment, the operation of the microcomputer in the system controller 106 will be explained below with reference to FIG. 14.

When an image printing command has been inputted to the operating portion 107 in FIG. 1, at Step 141, a laterally long wide decision signal from the input terminal 112, an upper and lower mask decision signal from the upper and lower mask signal decision unit, a printing sheet decision signal from the printing sheet decision unit 111 and an ink sheet decision signal from the ink decision unit 108 are read. Next, at Step 142, a decision is made whether or not a laterally long wide signal has been inputted from the laterally long wide decision signal from the input terminal 101. If the decision is YES, at Step 143, the two rows for the "laterally long" in the right column of the input signal in the table shown in FIG. 13 are referred to, and the table is searched to specify an image printing system, based on the printing sheet decision signal and the ink sheet decision signal (signals for showing whether the printing sheet and the ink sheet respectively are "Standard" or "Laterally long") read at Step 141. Then, the process proceeds to Step 144.

When the decision is NO at Step 142, a laterally long wide signal has not been inputted, and at Step 145, a decision is made whether the input signal is an upper and lower masked signal, based on the upper and lower mask decision signal read in Step 141. If the decision is YES, the process proceeds to Step 146, in which the two rows for "upper and lower masked" in the right column of the input signal in the table shown in FIG. 13 are referred to, and a printing system is specified by searching the table of FIG. 13 based on the printing sheet decision signal and the ink sheet decision signal, in the same manner as that of Step 143. Then, the process proceeds to Step 144.

When the decision is NO at Step 145, at Step 147, a decision is made that the input signal is a standard image signal because the input signal is neither a laterally long wide signal nor an upper and lower masked signal. Thus, the two rows for "Standard" in the right column of input signal in the table of FIG. 13 are referred to, and this table is searched and a printing system is specified in the same manner as that of Steps 143 and 146. Then, the process proceeds to Step 144.

When the printing system specified at Step 143, 146 or 147 makes a request to the expander and compressor 103 for expanding or compressing the image, at Step 144, the movable contact of the switch 113 is changed over to the lower side, and at Step 148, the operation of expanding or compressing is indicated to the expander and compressor 103. When the specified printing system does not require expanding or compressing, the movable contact of the switch 113 is changed over to the upper side at Step 144, at Step 148, an instruction is made to the expander and compressor 103 not to carry out the operation of expanding or compressing.

At Step 149, when the specified printing system is the print example A, C, F or G, the speed change-over unit 110 is changed over to the low speed side, and when the specified printing system is E or E', the speed change-over unit 110 is changed over to the high speed side.

When a print command has been inputted from the operating portion 107 at Step 150, the print operation is executed at Step 151.

Figure 15:
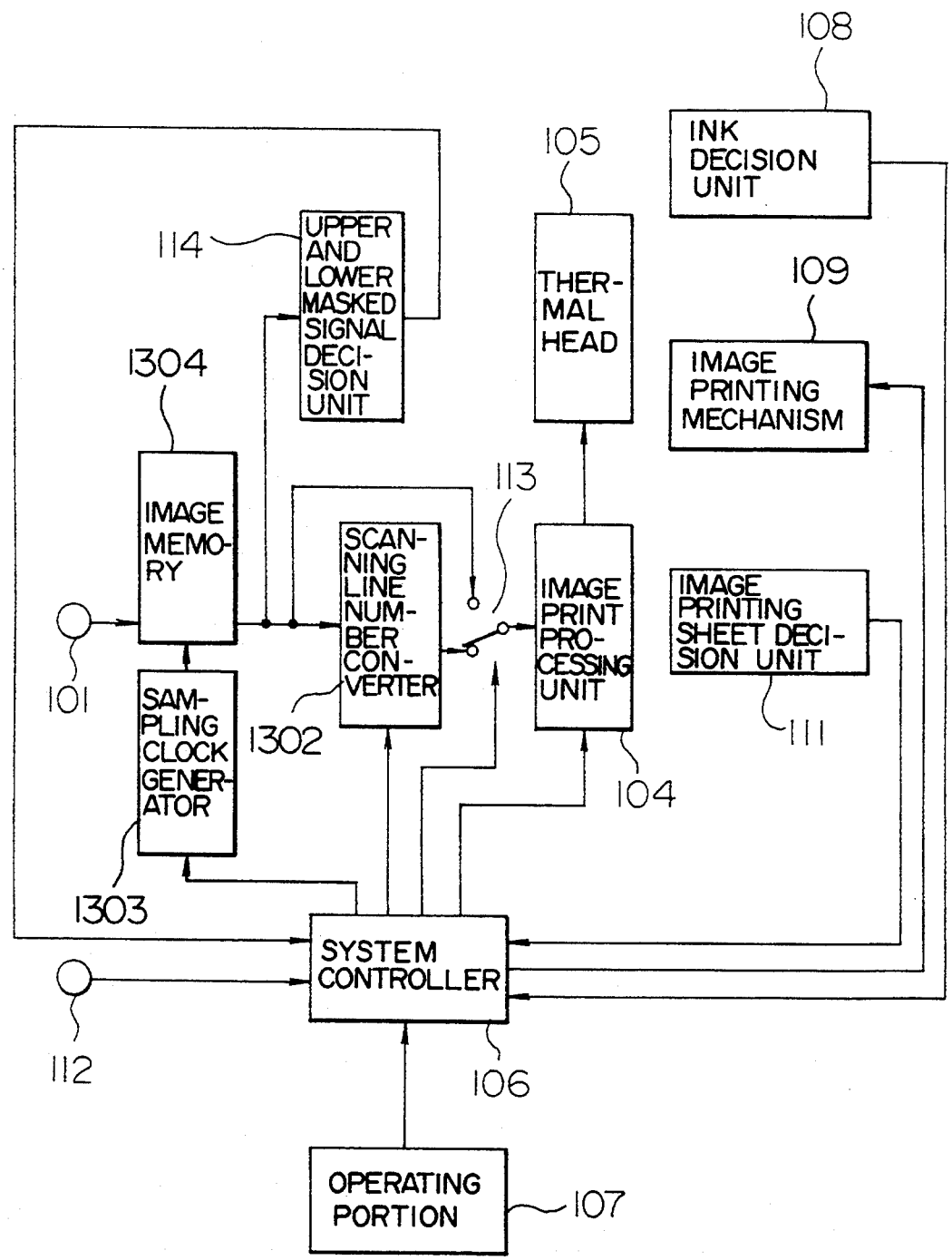
FIG. 15 is a block diagram for showing another embodiment of the present invention.

FIG. 15 shows another embodiment of the present invention. In FIG. 15, constituent elements having the same functions as those in FIG. 1 are shown with the same symbols.

Referring to FIG. 15, an analog image signal is inputted from an input terminal 101. The input signal is A-D converted and stored in an image memory 1304. A sampling clock generator 1303 can generate two kinds of clocks, that is, high frequency and low frequency clocks, according to the command of a system controller 106. An input signal from the input terminal 101 is sampled by the clock from the clock generator 1303, A-D converted and stored as image data in the image memory. Accordingly, the number of samples per one horizontal scanning line of an image signal is larger for the image data sampled by the clock of a high frequency than for the image data sampled by the clock of a low frequency. The number of samples per one horizontal scanning line for the former is about 1.3 times that for the latter.

The speed at which image data can be read from the image memory 1304 is always constant, and the speed for feeding an image printing sheet in an image printing mechanism 109 is always constant as well. Accordingly, when image data stored in the image memory 1304 by the clock of a high frequency is to be read out for printing, a laterally long printing sheet is suitable for the printing of this image. When image data obtained by the clock of a low frequency is to be printed, a printing sheet of the standard size is suitable.

A scanning line number converter 1302 is for expanding and compressing an image in only a vertical direction by using the conventionally known arts of the scanning line interpolation and the scanning line thinning technique. For example, when an upper and lower masking signal has been stored in the image memory 1304 by the clock of a high frequency, the scanning line number converter 1302 expands the image in a vertical direction at the time of printing the image. On the other hand, when a laterally long wide signal has been stored in the image memory 1304 by the clock of a low frequency, the scanning line number converter 1302 compresses the image at the time of printing the image.

According to the embodiment shown in FIG. 1, when a laterally long wide NTSC image is to be printed as shown in FIG. 10A, the image printing speed change-over unit within the image printing mechanism is changed over to have a fast speed of carrying the printing sheet so that the result of the image printing has a laterally long image. According to the embodiment shown in FIG. 15, when a laterally long wide NTSC image is inputted, the clock frequency of the sampling clock generator 1303 such as for the image memory 1304 is changed over to increase the sampling frequency so that the number of sampling is increased in the lateral direction of the screen. With the above arrangement, it is possible to Correctly maintain on the print out the vertical to lateral aspect ratio of the laterally long wide NTSC image while keeping constant the speed of carrying the printing sheet during the printing operation.

When a laterally long image of the upper and lower masking system is to be printed as shown in FIG. 10A by using a laterally long printing sheet and a laterally long ink sheet, the image vertical direction is expanded by the scanning line number converter 1302 and the image lateral direction is expanded by increasing the sampling clocks. When the printing sheet supply system of the image printing mechanism set for the image of the vertical to lateral aspect ratio of 3 to 4 is used straight, the sampling clock is set to have the frequency about 1.3 times the original frequency. When an image is to be printed to have a laterally long wide image on a laterally long printing sheet, the embodiment shown in FIG. 15 has a larger number of pixels to be printed than that of the embodiment shown in FIG. 1, so that the quality of the picture is improved. However, when the number of the pixels to be printed increases, the printing time becomes longer. Therefore, when a high-speed printing is required, the embodiment shown in FIG. 1 is more suitable.

Figure 16:
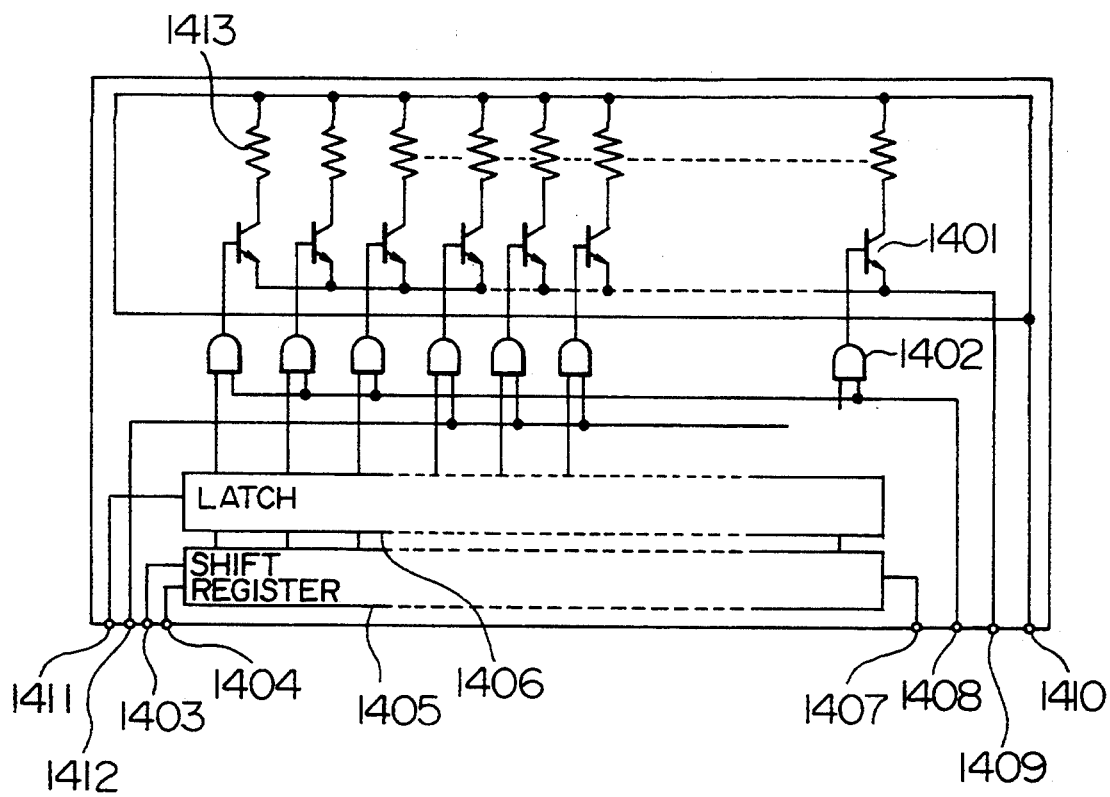
FIGS. 16 and 17 are block diagrams for showing further details of the main parts of FIG. 15.

FIG. 16 shows an embodiment of the thermal head which is suitable for printing the upper and lower masked signal by eliminating the upper and lower black belt portions as shown in FIG. 8 or FIG. 12.

Image data from the image print processing unit 106 is sequentially input, as series data for each pixel, to a terminal 1404. A clock transmitted in parallel with the print image data is inputted to a terminal 1403, and the print image data is sequentially transmitted to a shift register 1405. When the print image data has been transmitted by a vertical one line portion into the shift register 1405, a latch pulse is inputted to a terminal 1411 and the print image data stored in the shift register 1405 is shifted in parallel to a latch circuit 1406. A gate 1402 sends the print image data, stored in the latch circuit 1406 by a timing pulse called a strobe to be inputted to terminals 1408 and 1412, to a gate of the switch transistor 1401. In this case, a heating resistor 1401 connected to the conducted switch transistor is heated. This operation is repeated by 256 times and all the print image pixels are printed. Terminals 1409 and 1410 are power source terminals for supplying heating power. A terminal 1407 is a data output terminal for the shift register 1405 and this terminal is not particularly used for any purpose in the present embodiment.

1408 designates a strobe input terminal at the upper and lower end sides of the thermal head, and 1412 designates a strobe terminal of the central block of the thermal head.

Figure 17:
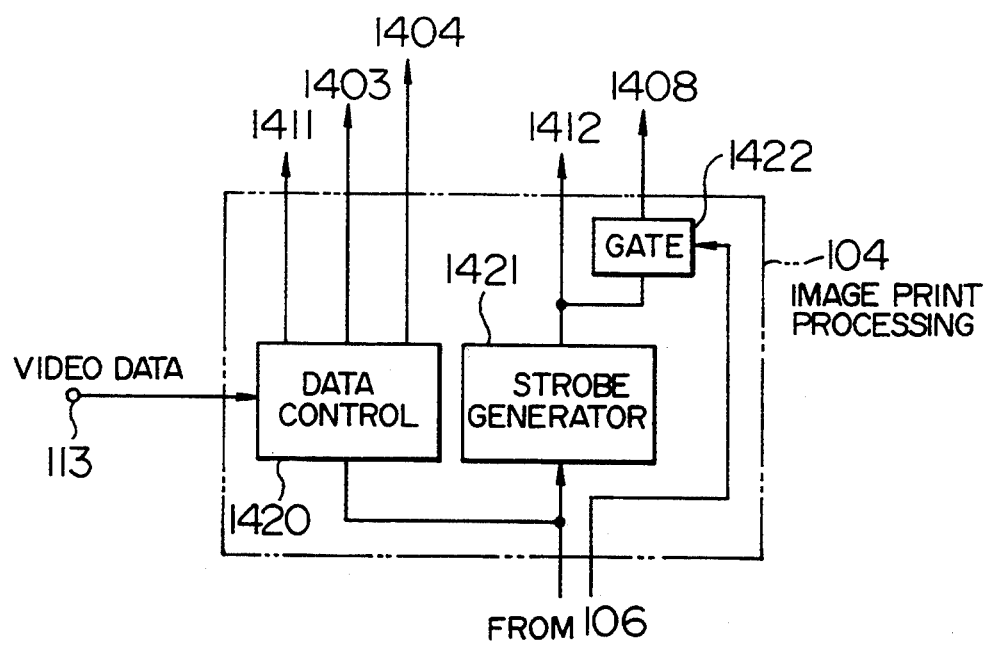

FIG. 17 is a block diagram for showing the configuration of the image print processing unit for generating a signal inputted to each input terminal of the thermal head shown in FIG. 16.

A data control unit 1420 converts the image data, sent through the switch 113, into print image data, transmits the print image data to the terminal 1404, and transmits a clock to the terminal 1403 at the same timing as the transmission of the print image data. When transmission of the print image data by one line has been completed, the data control unit 1420 transmits a latch pulse to the terminal 1411.

A strobe generator 1421 generates a strobe pulse of which pulse width has been adjusted by data on the properties of the ink sheet and the image printing sheet sent from the system controller 106, and supplies the generated strobe pulse both to the terminal 1412 for the central block of the thermal head and to the gate 1422. When an upper and lower masked signal is being inputted, the gate 1422 is kept OFF by the signal from the system controller 106 so that the strobe pulse is not transmitted to the terminal 1408.

In the case of printing an image as shown in FIG. 8 or FIG. 12, a strobe is inputted to the terminal 1412 and no strobe is inputted to the terminal 1408 and only the heater at the central portion of the thermal head is used, so that the masked portion forming black belts, transmitted by the upper and lower masking system, can be eliminated. According to the conventional thermo-sensitive head, a strobe line for controlling the current conduction has been in one system or has been divided into a plurality of systems such as four systems, with the current conduction time differentiated, with a view to reducing the load of the power source. According to the conventional thermo-sensitive head, a strobe has not been divided to control so that the masked portions of the upper and lower masking system are not printed, in a plurality of divided systems, not to mention in one system.

According to the present embodiment, the strobe of the thermal head is divided into two systems as described above. The first system is for the upper and lower blocks of the thermal head resistor corresponding to the upper and lower masked portions of the signal of the upper and lower masking system, and the second system is for the portion where the image of the center of the screen is being transmitted.

In order to print an image as shown in FIG. 6, both of the two systems are turned on. When the image of the upper and lower masking system has been inputted, the first system is turned off and only the second system is turned on, so that the masked portions can be eliminated from printing without requiring any processing at the image data level, and a print out as shown in FIG. 8 can be obtained.

Figure 18:
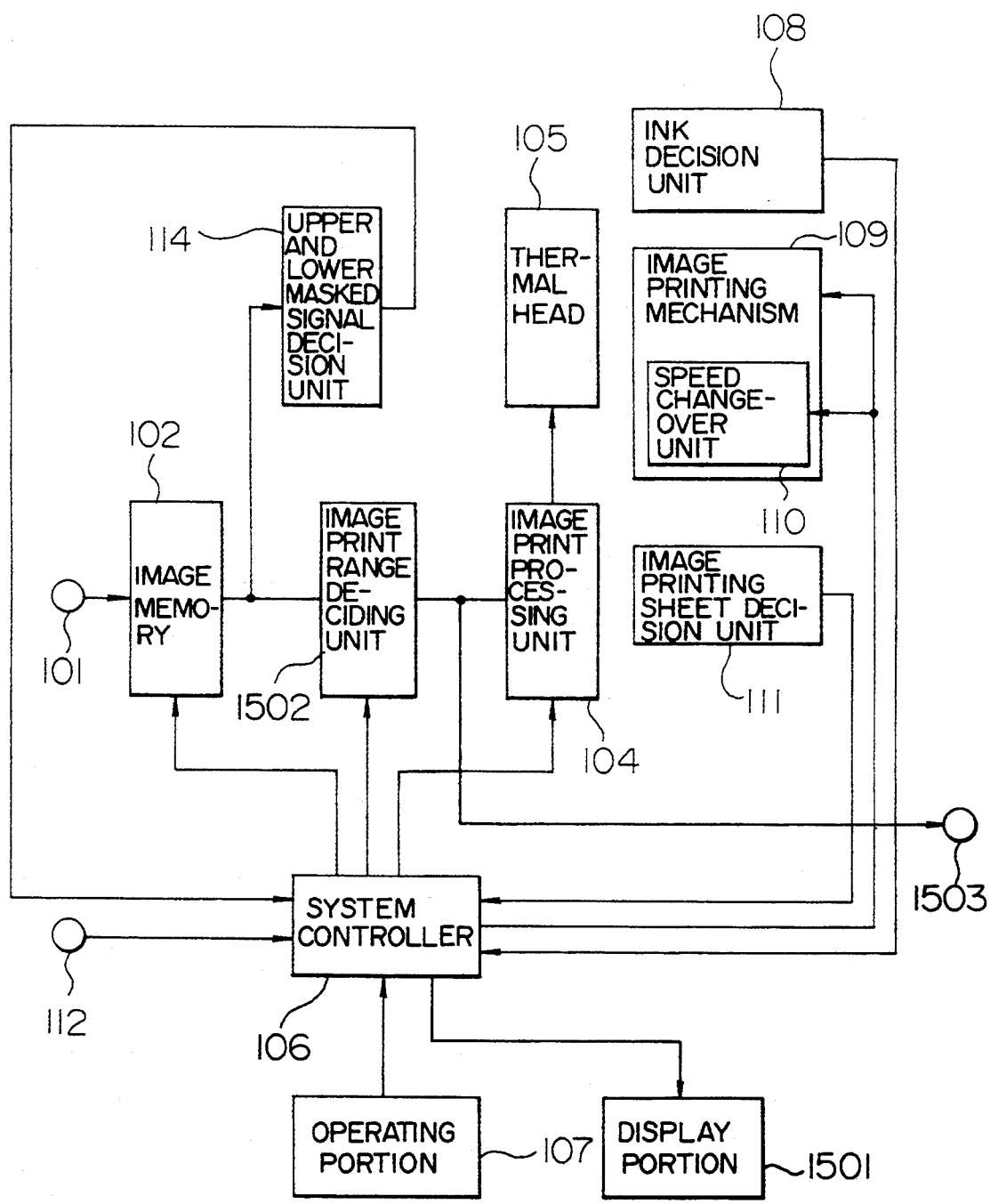
FIG. 18 is a block diagram for showing still another embodiment of the present invention.

FIG. 18 is a diagram for showing still another embodiment of the present invention. Constituent elements having the same functions as those in FIG. 1 are shown with the same symbols.

Referring to FIG. 18, 1501 designates a display portion for a system controller 106 to transmit information to the operator. The display portion 1501 is structured by a unit for making an on-screen display on a panel surface of the printer or at the end of the display connected to a terminal 1503. In stead of this display portion 1501, an alarm generating unit may be provided.

1502 designates an image print range deciding unit capable of cutting out non-printing portions, such as upper and lower masked portions, from the image data recorded in the image memory. 1503 designates a monitoring terminal for displaying the image recorded in the image memory and for outputting the image print out range to be decided by the image print range deciding unit 1502 to a monitoring television to be displayed in the displayed image.

According to the present embodiment, the image expander and compressor and the scanning line number converter, which are used in the embodiments shown in FIGS. 1 and 15, are not used to have a simple structure.

For a standard signal having the vertical to lateral aspect ratio of 3 to 4, the image is printed by changing over the image printing speed to the speed for printing a standard signal. In this case, an image as shown in FIG. 6 or FIG. 11 is printed according to the size of the printing sheet loaded. For an upper and lower masked signal, the upper and lower masked portions are eliminated and an image as shown in FIG. 8 or FIG. 12 is printed according to the size of the printing sheet loaded. For a laterally long wide signal, a laterally long printing sheet and a laterally long ink sheet are used to change over the sheet carrying speed of the image printing mechanism, so that an image print out having a correct vertical to lateral aspect ratio is obtained.

When any one of the printing sheet and the ink sheet loaded is not laterally long at the time when a wide signal has been inputted, it is not possible to make a print out as shown in FIG. 10A. The operation of the system controller when the above-described combination occurred will be explained with reference to FIG. 19.

Referring to FIG. 19, after the flow has started, at Step 191 a decision is made by the ink decision unit 108 and the image printing sheet decision unit 111, based on their respective decision signals, whether at least one of the ink sheet and the image printing sheet is a standard size sheet or not. If the decision is NO, both the ink sheet and the image printing sheet are laterally long size, and therefore, an input image signal of either system can be printed for the whole screen. Thus, at Step 192, a print starting command is obtained, and, at Step 193, the image is printed, and the flow ends.

When the decision at Step 191 is YES, only an image of the standard size can be printed. At Step 194, a decision is made, based on a signal from the input terminal 112, whether a laterally long wide signal has been inputted or not. If the decision is NO, at Step 195 a print starting instruction is obtained. At Step 196, the image is printed on an image printing sheet of the standard size.

At Steps 192 and 195, it is also good to limit an image printing range by the image printing range deciding unit and instruct the print starting, by eliminating the upper and lower masked portions, for example.

When the decision is NO at Step 194, a laterally long wide signal has been inputted in the mode which can print an image of the standard size, and the whole image can not be printed in this mode. Thus, at Step 198, the display portion 1501 displays or produces an alarm sound to indicate that the printing is not possible. Thus, the operator is informed that it is necessary to replace the printing sheet and the ink cassette to those for the laterally long wide size. In this case, based on the above display, the operator replaces the ink sheet and the image printing sheet to those for the laterally long wide signal, or limits the image printing range, by operating the image printing range deciding unit, so that the image can be printed by the combination of the currently loaded printing sheet and the ink sheet. After deciding the image printing range to meet the standard size, the print starting is instructed. However, even if a print starting has been instructed without deciding the image printing range, when the print started at Step 199, the image printing of the standard size is executed. Accordingly, when the laterally long wide signal has been inputted, the image printed is a result of the printing having the left and right sides of the original image eliminated. In this case, the printed image obtained is the standard size portion of the vertical to lateral aspect ratio 3 to 4, taken from the laterally long screen of the vertical to lateral aspect ratio of 9 to 16.

When the image printing range deciding unit is designed for the operator to be able to decide the range freely, not limited to the vertical to lateral ratio of 3 to 4, it is possible to take out an image of a desired size from the image memory and print the image although there is a limit to the printable size range, for example, in the center or the edge of the printing sheet. In order to decide the image printing range by the image printing range deciding unit, a monitoring television is connected to the monitoring output terminal 1503. The image printing range deciding unit adds a frame or the like to the signal read out from the image memory 102 so as to identify the image printing range. The operator can decide the image printing range by confirming the range on the screen of the monitoring television.

Masked portions of an upper and lower masked signal can be eliminated either by using the image printing range deciding unit or by using the thermal head explained in FIG. 16. When printing a wide signal, the image printing range deciding unit sets a maximum range so as not to narrow the image printing range. In this case, the operator can of course limit the image printing range to be small to make a print out of the small range.

When the operator has operated to start an image printing although the display portion has alarmed the operator by a display that a wide signal can not be printed based on the length of the printing sheet and the ink sheet respectively loaded, the system controller operates the image printing range deciding unit to take out the central portion of the laterally long signal at the vertical to lateral aspect ratio of 3 to 4 and prints the image in the mode as shown in FIG. 6. With the above arrangement, a request from the operator to make a print out by all means can be met.

According to the present invention, it is possible to obtain a print out of an image having a correct vertical to lateral aspect ratio of the image, without occurrence of unnecessary black belts, not only from a standard video signal but also from a laterally long signal of the upper and lower masking system and a signal of the wide system, in a video printer for obtaining a hard copy from a video signal.

What is claimed is:

1. A video printer for printing a plurality of kinds of images having different image formats, comprising:
   an image memory for storing image data of one image portion of an input image signal;
   image data processing means for converting image data from said image memory into image printing data;
   image printing means for executing an image printing based on image printing data from said image data processing means;
   input image format decision means for deciding an image format of an image signal inputted to said image memory;
   image printing format decision means for deciding an image printing format set in said image printing means;
   an operating portion for inputting an instruction of an operator; and
   a system controller for controlling at least one of said image memory, said image data processing means and said image printing means so that an image signal inputted to said image memory is printed to match said image printing format, based on an input signal decision signal from said input image format decision means, an image printing decision signal from said image printing format decision means and an instruction signal from said operating portion.

2. A video printer according to claim 1, wherein said image data processing means includes an expander and compressor for expanding or compressing image data read from said image memory, switching means for selecting one of image data read from said image memory and image data outputted from said expander and compressor, and image print processing means for converting image data obtained from said switching means into image data suitable for printing the image by said image printing means.

3. A video printer according to claim 2, wherein said expander and compressor is a vertical direction expander and compressor for expanding or compressing image data read from said image memory, into a vertical direction.

4. A video printer according to claim 3, wherein said image printing means includes a loading portion for holding an image printing sheet on which an image is to be printed, speed change-over means for changing over a speed for shifting a printing sheet held by said loading portion, through an image print portion, and an image print executing portion for executing an image print on an image printing sheet shifted through said image printing portion.

5. A video printer according to claim 4, wherein said image print executing portion includes a thermal head for executing an image print driving based on image print data from said image print processing means, and an ink sheet for printing ink to said image printing sheet by said thermal head.

6. A video printer according to claim 5, wherein said ink sheet is a belt-shaped sheet on which three principal colors are laid out sequentially repeatedly.

7. A video printer according to claim 6, wherein said image printing format decision means is means for detecting a signal relating to at least one of the size of a printing sheet held in said loading portion and the length of each color section of said ink sheet.

8. A video printer according to claim 7, wherein said image printing format decision means includes ink decision means for detecting a signal relating to section length of each color section of said ink sheet, and image printing sheet decision means for detecting a signal relating to the size of an image printing sheet held in said loading portion.

9. A video printer according to claim 7, wherein said system controller has change-over control means for controlling the change over of said switching means and the change over of said speed change-over means, based on a detection signal from said image printing format decision means, so that the image is printed to match the image printing format decided by said image printing format decision means.

10. A video printer according to claim 1, wherein said input image format decision means is an image vertical to lateral aspect ratio decision means for deciding at least a standard image signal of the vertical to lateral aspect ratio of 3 to 4 and a laterally long wide signal of the vertical to lateral aspect ratio of 9 to 16.

11. A video printer according to claim 10, wherein said image printing means includes a loading portion for holding an image printing sheet on which an image is to be printed, carrying means for carrying an image printing sheet of said loading portion through an image printing portion and image printing executing means for printing an image on said image printing sheet by said image printing portion.

12. A video printer according to claim 11, wherein said carrying means has speed change-over means for changing over the speed for carrying said image printing sheet.

13. A video printer according to claim 12, wherein said image print executing means includes a thermal head for driving an image printing based on image printing data from said image data processing means and a belt-shaped ink sheet on which three principal colors are sequentially repeatedly laid out to print an image on an image printing sheet in said image printing portion by said thermal head.

14. A video printer according to claim 13, wherein said image printing format decision means is means for detecting a signal relating to at least one of the size of an ink printing sheet held in said loading portion and the section length of each color section of said ink sheet.

15. A video printer according to claim 12, wherein said system controller includes change-over means for changing over a carrying speed of said carrying means by said speed change-over means, based on a decision signal from said image printing format decision means and a decision signal from said image vertical to lateral aspect ratio decision means.

16. A video printer according to claim 10, wherein said image memory includes image data memory means for storing image data obtained by sampling said input image signal and A-D converting said sampled data, and a sampling clock generator for altering a sampling frequency of said image data memory means.

17. A video printer according to claim 16, wherein said system controller has means for selecting a sampling frequency of said sampling clock generator, based on a decision signal from said image vertical to lateral aspect ratio decision means and a decision signal from said image printing format decision means.

18. A video printer according to claim 17, wherein said image data processing means includes an expander and compressor for expanding or compressing image data read from said image memory, switching means for selecting one of image data read from said image memory and image data outputted from said expander and compressor, and image print processing means for converting image data obtained from said switching means into image data suitable for printing the image.

19. A video printer according to claim 18, wherein said expander and compressor is means for interpolating or thinning the scanning lines of an image.

20. A video printer according to claim 10, wherein said image data processing means includes image range deciding means for deciding an image printing range of image data read from said image memory, and image print processing means for converting image data obtained from said image printing range deciding means into image data suitable for printing the image by said image printing means.

21. A video printer according to claim 1, wherein said system controller includes relation decision means for deciding whether said input image is in a relation suitable for printing an image by said image printing means, based on a decision signal from said image print format decision means and a decision signal from said input image format decision means, means for generating an alarm when said relation decision means has decided that said input image is not in a suitable relation, and means for executing an image printing when said relation decision means has decided that said input image is in a suitable relation.

22. A video printer according to claim 1, wherein said image printing means includes loading means for holding an image printing sheet on which an image is to be printed, carrying means for carrying an image printing sheet of said loading portion through an image printing portion, and a thermal head for printing an image on said image printing sheet carried to said image printing portion based on image printing data from said image data processing means.

23. A video printer according to claim 22, wherein said thermal head includes a resistor group consisting of a plurality of linearly arranged heating resistors, logic circuits for on-off controlling current conduction to each resistor of said resistor group, and strobe means for dividing said logic circuits into a plurality of blocks and controlling said current conduction for each block.

24. A video printer according to claim 23, wherein said strobe means includes blocks for controlling current conduction to both end portions of said resistor group, and a block for controlling the central portion of said resistor group.

25. A video printer according to claim 1, wherein said input image format decision means includes laterally long wide decision means for deciding whether said input image signal is a laterally long wide signal of the vertical to lateral aspect ratio of 9 to 16 or not, and upper and lower masked signal decision means for deciding whether or not said input image signal is an upper and lower masked signal having a black belt at the upper and lower portions of the image respectively when said laterally long wide decision means has decided that said input image signal is not a laterally long wide signal.

26. A video printer according to claim 25, wherein said system controller includes upper and lower mask eliminating means for eliminating upper and lower black belt portions of an upper and lower masked signal, in at least one of said image memory, said image data processing means and said image printing means, when said upper and lower masked signal decision means has decided that said input image signal is an upper and lower masked signal.

27. A thermal head, comprising:
  a group of resistors made of a plurality of resistors arranged on a line, said resistors being divided into a first block of resistors disposed at a central portion of said thermal head and a second block of resistors disposed at end portions of said thermal head, said end portions being on opposite sides of said central portion;
  a logic circuit for inputting data for on-off controlling current conduction to each one of said resistors; and
  strobe means for controlling current conduction of each of said first block and said second block, wherein said strobe means is divided into two systems, with one of said systems for controlling current conduction of said first block, and the other one of said systems for controlling current conduction of said second block.

28. A video printer for printing a plurality of kinds of images having different image formats, comprising:

- image data processing means for converting image data of one image portion of an inputted image signal into image printing data;
- image printing means for executing an image printing based on image printing data from said image data processing means;
- input image format decision means for deciding an image format of an image signal inputted to said image data processing means;
- image printing format decision means for deciding an image printing format set in said image printing means;
- an operating portion for inputting an instruction of an operation; and
- a system controller for controlling at least one of said image data processing means and said image printing means so that an image signal inputted to said image data processing means is printed to match said image printing format, based on an input signal decision signal from said input image format decision means, an image printing decision signal from said image printing format decision means and an instruction signal from said operating portion.

29. A video printer for printing a plurality of kinds of images having different image formats, comprising:

- an image memory for storing image data of one image portion of an input image signal;
- image data processing means for converting image data from said image memory into image printing data;
- image printing means for executing an image printing based on image printing data from said image data processing means;
- input image format decision means for deciding an image format of an image signal inputted to said image memory;
- image printing format decision means for deciding an image printing format set in said image printing means;
- an operating portion for inputting an instruction of an operator; and
- a system controller for controlling at least one of said image memory, said image data processing means and said image printing means so that an image signal inputted to said image memory is printed to match said image printing format, based on an input signal decision signal from said input image format decision means, an image printing decision signal from said image printing format means and an instruction signal from said operating portion;
- wherein said image printing means includes a thermal head, comprising:
  - a group of resistors made of a plurality of resistors arranged on a line, said resistors being divided into a first block of resistors disposed at a central portion of said thermal head and a second block of resistors disposed at end portions of said thermal head, said end portions being on opposite sides of said central portion;
  - a logic circuit for inputting data for on-off controlling current conduction to each one of said resistors; and
  - strobe means for controlling current conduction of each of said first block and said second block, wherein said strobe means is divided into two systems, with one of said systems for controlling current conduction of said first block, and the other one of said systems for controlling current conduction of said second block.

* * * * *